Dec. 21, 1954     A. J. LOEPSINGER     2,697,553
CONTROL APPARATUS
Filed Sept. 22, 1950     4 Sheets-Sheet 4
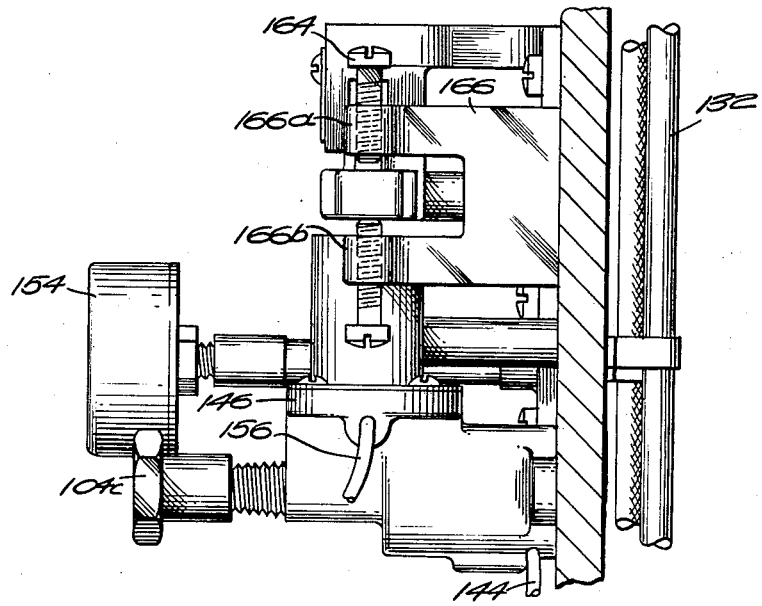
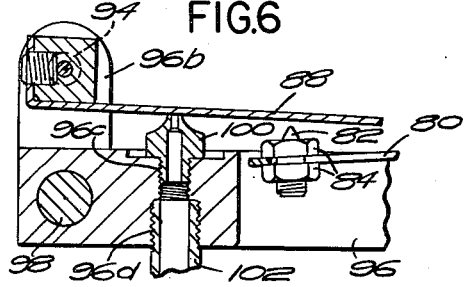
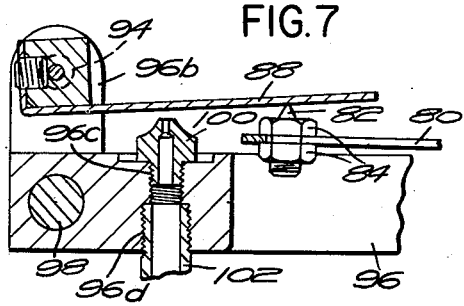
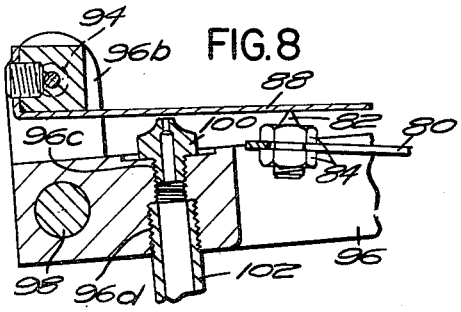
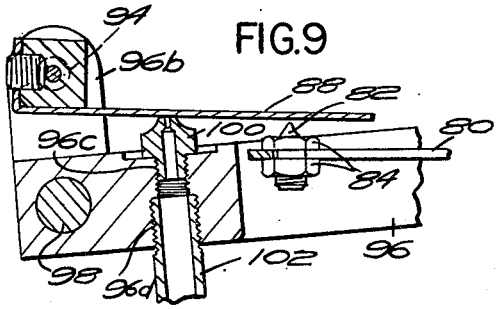
*INVENTOR.*
Albert J. Loepsinger
BY
Harry Dexter Reed
ATTORNEY

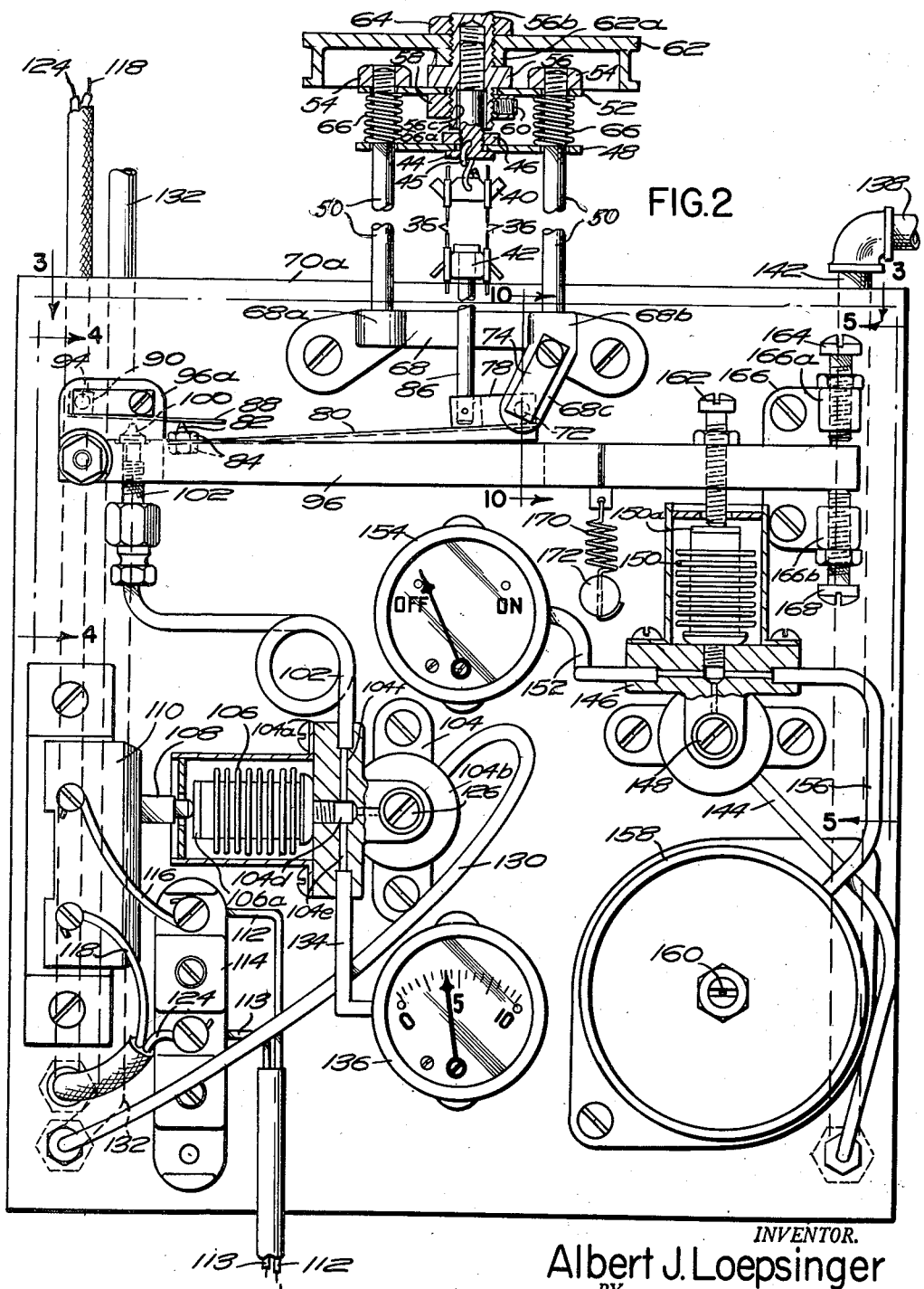

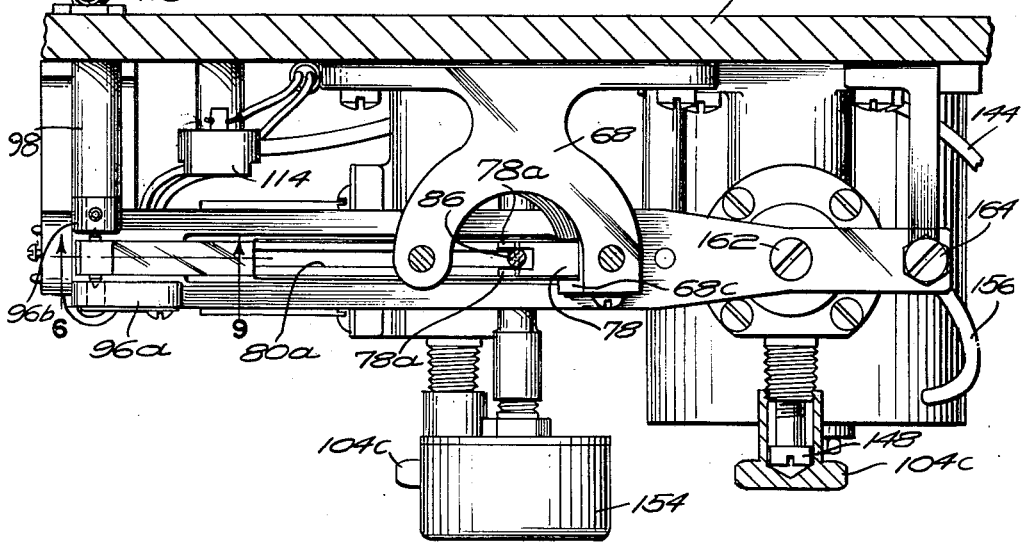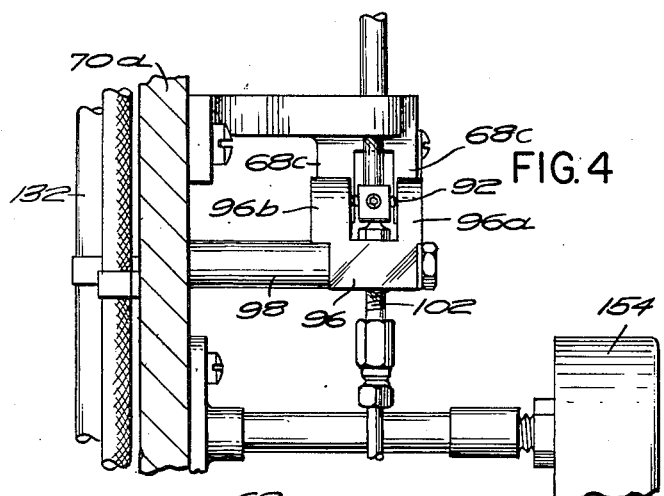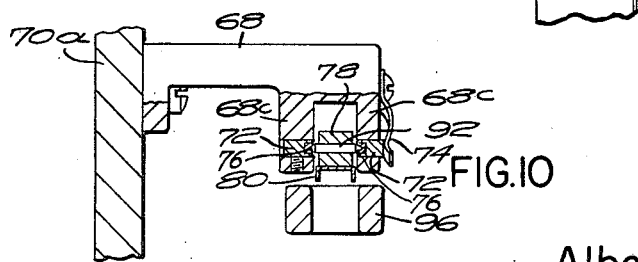

United States Patent Office 2,697,553
Patented Dec. 21, 1954

2,697,553
CONTROL APPARATUS

Albert J. Loepsinger, Providence, R. I., assignor to Grinnell Corporation, Providence, R. I., a corporation of Delaware Application September 22, 1950, Serial No. 186,145

13 Claims. (Cl. 236—44)

This invention relates to improvements in control apparatus. More especially it has to do with apparatus responsive to a change from a desired condition for actuating or rendering inactive an agency which affects said condition, to the end that the desired condition will be promptly restored and thus maintained as constant as possible. The features of the present improvements are herein disclosed in connection with apparatus particularly applicable to the control of humidifying agencies for the purpose of maintaining a desired per cent of relative humidity.

In one form of such apparatus heretofore available, an element sensitive to changes in relative humidity has caused a valve to be moved toward or from a fixed vent, the effective opening or closing of which has brought about or stopped the action of the humidifying means. In both cases when such opening or closing occurs, the relative positions of the valve and the vent are not the same, the distance between the two being always greater to effect opening than to effect closing. As a consequence with such arrangement the shutting off of the humidifying means has been appreciably delayed and as a result undesirable overruns or periods of overhumidification have characterized the performance of such apparatus with the relative humidity fluctuating between relatively wide limits.

The primary object of the present invention is to provide a much more sensitive controller to the end that the controlled condition will remain more nearly constant. More specifically, it is the purpose of the present improvements to provide a movable vent and apparatus to move it toward or from the movable valve in accordance with the operation of the humidifying means.

In other words if the valve is moved in one direction in response to a fall in the relative humidity and thereby brings about the starting of the humidifying means, the latter reaction in turn causes the vent to be moved in the same direction as the valve was moved. In consequence when the valve is moved in the opposite direction, due to a rise in the relative humidity, it need travel but a relatively short distance to produce the necessary relationship with the moved vent to effect the stopping of the humidifying means. When the valve has so moved in the opposite direction and the humidifying means are thereby rendered inactive, this reaction brings about the shifting of the vent also in the same opposite direction or back to its original position.

In the preferred form of the improved apparatus disclosed herein, the control valve is moved away from the movable vent in response to falling relative humidity and when the vent is thereby effectively opened the humidifying means are actuated. Promptly thereafter the vent is moved toward the valve. As the relative humidity begins to rise—due to the discharge from the humidifiers—and the valve consequently moves toward the already moved vent, the latter is effectively closed much sooner than it would have been had it remained fixed in its initial position. As a result the humidifying means are shut off before any great rise in relative humidity occurs and the heretofore characteristic overrun is materially reduced both in extent and duration. Upon the shutting off of the humidifiers, the control apparatus is actuated to move the vent in direction away from the valve and back to its initial setting. Thus when the relative humidity again starts falling—due to the inaction of the humidifying means—and the valve begins moving away from the vent, it can promptly effect opening of the latter and repetition of the cycle just described.

If the relative humidity conditions are such that the humidifying means should remain either active or inactive, the improved apparatus so provides. But for the most part this is not usually necessary because the novel action of the controller, with the movements of both the valve and vent occurring frequently and following small changes in the relative humidity, maintains the latter close to the per cent desired. Thus the overruns are minimized and the variations from the desired condition are kept small in extent and of short duration.

The best mode which has been contemplated of applying the principles of this invention is shown in the accompanying drawings but these are to be deemed primarily illustrative because it is intended that the patent shall cover by suitable expression in the appended claims whatever features of patentable novelty reside in the improvements disclosed.

In the accompanying drawings:

Fig. 2 is a front elevation of the improved control apparatus with the cover of the cabinet removed;

Fig. 3 is a plan view in section as on line 3—3 of Fig. 2;

Fig. 4 is a partial side elevation, taken as on line 4—4 of Fig. 2;

Fig. 5 is another partial side elevation, taken as on line 5—5 of Fig. 2;

Figure 1:
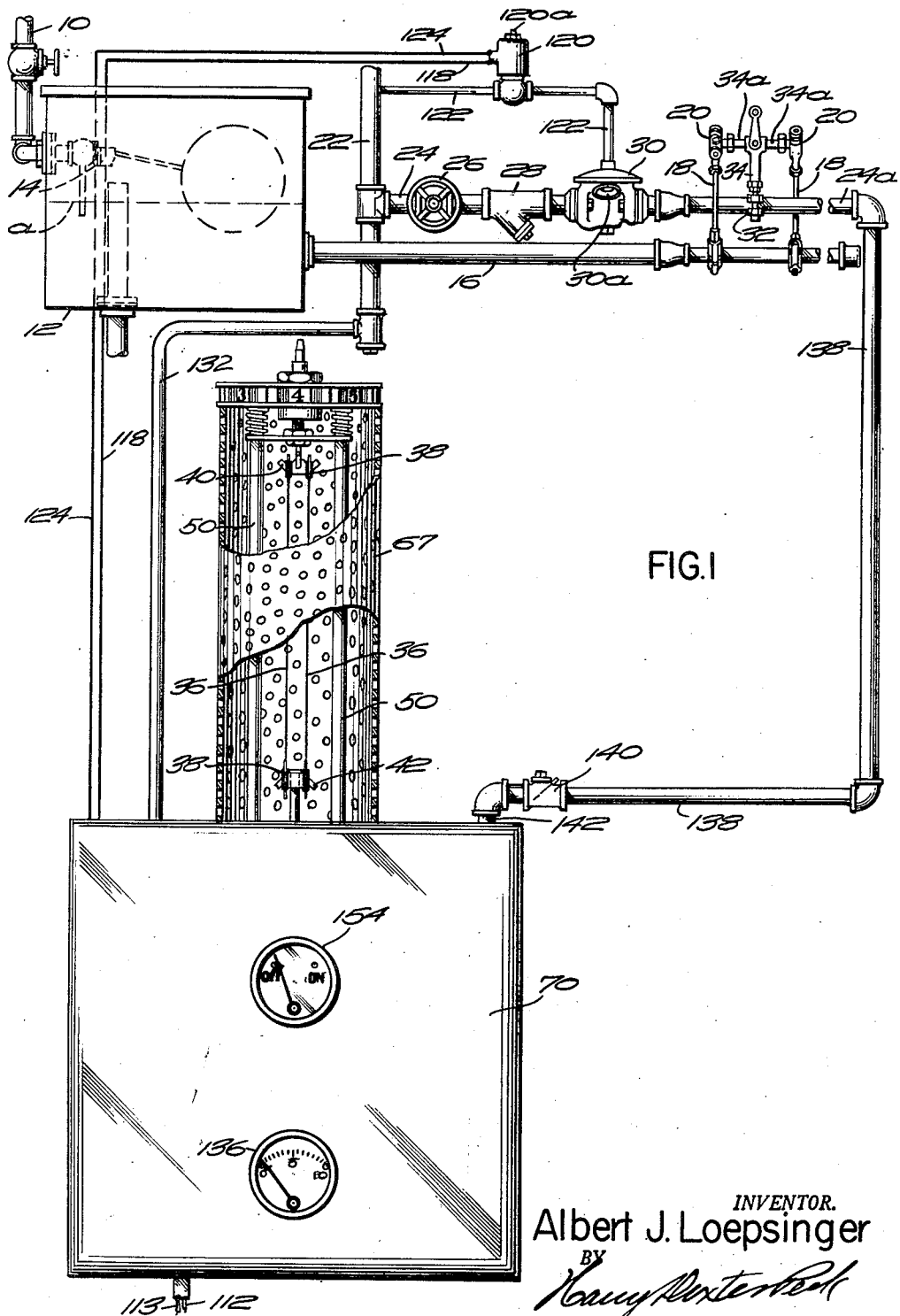
Fig. 1 is an elevation, somewhat diagrammatic and partly in section, of a humidifying system embodying the improved control apparatus.

Figs. 6 to 9 inclusive are larger scale elevations in section, as on line 6—9 of Fig. 3, showing relative positions of certain details; and Fig. 10 is an elevation in section, taken as on line 10—10 of Fig. 2.

Referring now to the drawings and particularly to Fig. 1, there is shown somewhat diagrammatically a humidifying system embodying my improved control apparatus. Water is led through a supply pipe 10 to a tank 12 and maintained at a desired level, indicated by the dotted line a, by the usual ball-float level control 14. From the tank the water is conducted through one or more horizontally disposed pipes 16 from which tubes 18 extend upward to atomizers 20 which in this showing constitute the humidifying means. These atomizers are located somewhat above the level a so that the water standing in the tubes 18 at this level must be drawn up into the atomizers for discharge into the atmosphere of the enclosure served by the system.

Air under pressure is supplied through the pipe 22 from which extends a horizontal line 24—24a running parallel to the water pipe 16. In this horizontal air line is a gate valve 26, usually open, a strainer 28, a diaphragm valve 30, and suitable connections 32 from which vertical risers 34 lead to the humidifying means. As shown in Fig. 1 there are two atomizers 20 served by a riser 34 and its branches 34a, but these are merely illustrative of many such atomizers on the system.

When the air flows through an atomizer water is drawn up through tube 18 by the aspirating action of the air and then discharged from the atomizer as a fine fog into the atmosphere. Thus the moisture content of the room air is increased and the per cent of relative humidity of that air is raised. When the atomizers are inactive, that is not discharging any water into the air, the relative humidity usually begins to fall and more moisture must be discharged from the atomizers to restore the relative humidity to that desired. It might also be noted that material changes in the temperature of the room air within the enclosure will also affect the relative humidity sending it down if the temperature rises and sending it up if the temperature falls. For the purpose of this disclosure we need not concern ourselves as to the causes of the changes in relative humidity because the improved control apparatus responds and performs to any change in the relative humidity regardless of what causes such a change to occur.

The control apparatus comprises as the sensitive elements a pair of strips of animal membrane 36 which elongate as the relative humidity rises and shorten as the relative humidity falls. These membranes have grommets 38 near their ends which are slipped over double hook members 40 and 42. The upper hook member 40 (see Fig. 2) is pivotally hung from a hook 45 whose shank is secured to a screw 44, the head of which is clamped by a nut 46 to a plate 48 extending sidewise to and around vertical rods 50. The upper ends of these rods are secured to another plate 52 by nuts 54. Through a hole at the center of this plate extends the lower externally threaded shank 56a of a sort of sleeve stud 56. The body of this stud rests on the plate 52 and is held in rotative sliding engagement therewith by a nut 58 threaded on the shank 56a and held in proper adjustment by a set screw 60. The upper and also externally threaded shank 56b of the stud 56 extends through the hub 62a of a dial wheel 62 and is securely clamped thereto by a lock nut 64. A bore 56c in the sleeve stud 56 is internally threaded at its upper end for engagement by the external threads on the shank of the screw 44. When the dial wheel is rotated the sleeve stud 56 is turned and causes the screw 44 to rise or fall, since the latter is held against rotation by the engagement of the plate 48 with the rods 50. Thus the membranes and associated movable parts can be adjusted for any desired degree of relative humidity. Springs 66 between the plates 48 and 52 exert sufficient force to prevent any loose play of the plate 48 and the screw 44. The rods 50 alone ordinarily provide sufficient protection for the membranes 36 but if the danger of their being damaged is great a perforated sleeve 67 may be added (see Fig. 1).

The rods 50 at their lower ends are secured to separated horizontally disposed arms 68a and 68b of a bracket 68 mounted on the back wall 70a of the control cabinet 70. From the arm 68b of the bracket another pair of arms 68c are inclined downwardly to provide bearings 72, preferably jewels, held in place by spring plates 74 secured on the bracket (see Fig. 10). In these jewel bearings rotate pointed journals 76 on a small light block 78 to which is secured a thin channel shaped strip 80 hereinafter called the beam. This has a longitudinal slot 80a throughout most of its length (see Fig. 3) along which a pointed stud 82 may be adjusted and clamped in place by lock nuts 84.

Pivotally attached to the bifurcated end 78a of the block 78 is the lower end of a small rod 86 which extends upward between the horizontal arms of the bracket and through a bore in the lower hook member 42 and has its flanged upper end resting on the top surface thereof. Since the bracket 68, rods 50 and other associated parts do not move in response to changes in the humidity conditions while the strips of membrane do respond, it follows that as the membranes absorb moisture from the atmosphere and elongate, the beam 80 will be swung downward in a counterclockwise direction as seen in Fig. 2, and as the membranes give up moisture to the atmosphere and shorten, the beam 80 will be swung upward in the clockwise direction. Because of the leverage involved, the distance moved by the hook member 42 is multiplied and hence causes an appreciably greater travel of the stud 82.

The point of this stud engages the underside of another very light beam 88 hereinafter called the vent valve or valve which consists of a thin strip secured to a small square block 90 having journals 92 extending into jewel bearings 94 carried by ears or arms 96a and 96b of a lever 96. The latter is pivotally mounted on a rod 98 secured to the back plate 70a. It is to be noted that regardless of the swing of this lever, as will presently be described, the vent valve swings independently on the axis of the journals 92 and whenever engaged by the stud 82 on the beam 80 also moves in accordance with the changes in the relative humidity affecting the sensitive membranes. The several parts hung on the membranes are as a whole very light in weight and since both the journals on the block 78 and of the block 90 turn in jewel bearings the load imposed on the membrane is consequently quite small. And since the two membranes are hung from the pivotally mounted upper hook member 40, one-half this load is carried by each sensitive element.

The lever 96 near its pivotally mounted end has a vertically disposed hole (see Fig. 6) with threaded portions 96c and 96d of different diameters. Into the upper portion 96c is screwed a vent nozzle 100, hereinafter called the vent, which is opposite to and in position to be effectively opened or closed by the vent valve 88, as the latter swings toward or from the vent or the latter moves toward or from the valve. This is a novel feature of the present invention because, so far as is known to applicant, in apparatus of this sort the vent has heretofore been fixed in position.

Into the lower portion 96d of the hole in the lever 96 is threaded a tube 102 which extends to the base block 104a (see Fig. 2) of a restriction valve and bellows unit 104. The stem of a bellows 106 is screwed into this base block and the movable end 106a of the bellows engages the exposed end of a plunger 108 of an electric Micro Switch 110, the latter being so arranged that as the bellows expands under pressure and its movable end moves to the left, as seen in Fig. 2, the electric switch is opened. This switch is in a circuit leading from main wires 112, 113 to a terminal block 114 secured to the back plate 70a. From this block a wire 116 goes to the Micro Switch from whence a wire 118 leads to a solenoid valve 120 in an air pipe 122 connected from the air supply pipe 22 to the diaphragm chamber of the diaphragm valve 30. Another wire 124 leads back from the solenoid valve to the terminal block 114 for connection with the main wires 112, 113. When the switch 110 is open the solenoid of the solenoid valve 120 is de-energized and the valve is then closed.

Connected to the base block 104a is the casing 104b of a restriction valve whose needle point 126 can be adjusted by removing a cap 104c (shown removed in Fig. 2) to determine the rate of flow of air from a tube 130 (connected by pipe 132 with the air supply pipe 22) into the passageway 104d in the base block 104a. Air in this passageway can enter the bellows 106, or pass through a branch passageway 104e and a tube 134 to a gauge 136, or flow through another branch passageway 104f into the tube 102 and thence to the vent nozzle 100.

When the valve 88 is close enough to the vent 100 to provide an effective closing thereof, and by this is meant a closing sufficiently small for the rate of escape of air through the vent to be less than the rate of flow of air past the restriction valve 126, the pressure will build up in the bellows 106, cause it to expand and bring about the opening of the switch 110. The solenoid valve 120 will be deenergized and closed, thus cutting off the flow of air to the diaphragm chamber of the diaphragm valve 30 and permitting the latter to remain closed and thus shut off the supply of air pressure from pipe 22 to the pipe 24a beyond the diaphragm valve. The closing of this valve 30 against the admission or passage of any air from the supply simultaneously opens a vent 30a in the valve whereby the pressure in the line 24a beyond the valve may be dissipated. This will stop flow of air to the atomizers and the latter will cease to discharge any water into the room atmosphere.

On the contrary, when the valve 88 and the nozzle 100 are sufficiently separated to provide an effective opening of the vent, that is an opening large enough so that the rate of escape of air through it is greater than the rate of flow of air past the restriction valve 126, then the pressure in the bellows 106 will be reduced and the inherent resiliency of the bellows will cause it to collapse and allow the switch 110 to close and complete the circuit through the solenoid valve 120. The latter will be energized and opened, air will pass from the supply pipe 22 to the diaphragm chamber of the diaphragm valve 30 and effect the opening of this valve (and close its vent 30a) so that the air will pass thence through pipe 24 into pipe 24a and on through the riser 34 to the atomizers. The discharging air will draw up the water through the tubes 18 and discharge it with the air as a fine fog into the atmosphere of the enclosure being humidified.

Air from the supply will also flow through a pipe 138, connected to the air pipe 24a, past a check valve 140 and thence through a pipe 142 and a tube 144 to another restriction valve and bellows unit 146 substantially like the unit 104. Air passing the needle valve 148 of this unit can enter the bellows 150, can flow through a tube 152 to an "On and Off" gauge 154, and can flow through another tube 156 to a tank 158 mounted on the back plate 70a. This tank has an adjustable vent 160 by which the rate of escape of air from the tank and the associated air system between the tank and the check valve 140 can be regulated. This vent 160 is so adjusted that the rate of air flow through it is always less than the rate of flow past the restriction valve 148. Accordingly, the air flowing past this valve will build up a pressure which will expand the bellows 150 and cause its movable end 150a to move upward into engagement with an adjusting screw 162 mounted on the lever 96. The air pressure will also shift the indicator needle of the gauge 154 from the "off" to "on" position, and also pass into the tank 158.

The expansion of the bellows 150 will move the adjusting screw 162 upward and swing the lever 96 counterclockwise about its bearing on the rod 98. The extent of this upward swing is determined by the setting of another adjusting screw 164 mounted in the upper outstanding arm 166a of a bracket 166 secured to the back plate 70a. A lower outstanding arm 166b of this bracket carries still another adjusting screw 168 for limiting the downward or clockwise swing of the lever 96.

Since the air passing the open diaphragm valve 30 goes to both the atomizers and to the bellows 150 this upward movement of the lever 96 occurs a short period after the atomizers begin to discharge humidity into the enclosure, the extent of the period being determined by the settings of the restriction valve 148 and of the vent 160 from the tank. If the rate of flow through the restriction valve is relatively much faster than the rate of escape from the vent, the upward movement of the lever will be rapid and occur shortly after the atomizers become active. On the contrary, if the rates of flow past the restriction valve and through the vent are more nearly equal, the escape of course being always at a somewhat slower rate than the inflow, the lever will rise more slowly and will reach its upper limit of swing after a longer period following discharge from the atomizers.

When the atomizers are rendered inactive by the closing of the diaphragm valve 30, the air in the pipes 24a and 138 is promptly vented to the atmosphere through the vent 30a of the diaphragm valve. The check valve 140, however, holds back the air in the pipe 142, tube 144, bellows 150 and tank 158 and the rate of its escape is determined by the setting of the vent 160. If set for slow escape of the air the pressure will fall slowly whereas if the vent is set for more rapid escape the pressure effective on bellows 150 will fall rapidly. In either case, the pressure acting on the bellows becomes too low to overcome the resiliency of the bellows itself and the tension of a spring 170 which is anchored to a post 172 (mounted on the back plate 70a) and connected to the lever 96. Thus in due course after the shutting-off of the humidifiers, the lever 96 will be swung downward thus moving the vent nozzle 100 in direction away from its valve 88.

It is possible to vary the relative positions of the valve 88 and nozzle 100 so that the movement of the valve due to a fall in relative humidity would be in direction toward the nozzle. In that case the bellows 106 would expand and it would be necessary to have a switch in place of the switch 110 which would close upon such movement of the bellows and thereby bring about the activity of the atomizers. However, the arrangement shown in the drawings is preferred because if for any reason the nozzle 100 should become clogged so that the air pressure would be held back and expand the bellows, the resulting opening of the switch 110 would prevent atomizer discharge. Likewise if there should be a failure of the current or the electric circuit should be broken, this would in effect be the same as opening switch 110 and the atomizers would remain inactive. It is usually deemed preferable, in the event of unexpected failure of the control to perform as intended, that the humidifying means remain inactive rather than have them continue in operation and possibly produce excessive humidification of the room.

In setting the control apparatus, the upper screw 164 should be temporarily turned down until it clamps the lever 96 against the lower screw 168, with the lever preferably in a substantially horizontal position as shown in Fig. 2. This, of course, fixes the nozzle 100 for the time being. The dial wheel 62 is then rotated in one direction or the other to vary the position of the upper hooked member 40 so that at the relative humidity it is desired to maintain, the valve 88 will be just far enough away from the vent 100 to cause the atomizers to go into action. This, in effect, determines what may be called the "on" position of the control apparatus for the relative humidity selected. With the vent thus temporarily fixed, the so-called "off" position of the apparatus would be that position to which the valve 88 must be moved to close the vent effectively.

After the "on" position has been established as just described, the screw 164 is then backed off and locked in position, to limit the extent of movement or amplitude of swing of lever 96 and hence the distance through which the vent 100 moves upward and downward. The restriction valve 148 and the vent 160 are also adjusted to fix the speed at which the lever swings. These adjustments are all made in accordance with the conditions at the location where the control apparatus is installed, remembering that the oscillation of the nozzle 100 should be about equal to or not greatly exceed the movement of the valve 88 between the aforesaid "on" and "off" positions when the nozzle is initially held temporarily in the fixed position.

Assume that the relative humidity of the enclosure being conditioned is at the desired per cent. The membranes 36 are elongated enough to hold the beam 80 and its pointed stud 82 at a position, such as shown in Fig. 2, where the vent valve 88, although slightly separated from the nozzle 100, is nevertheless close enough to the latter to close it effectively. Bellows 106 is expanded, switch 110 is open, solenoid valve 120 and diaphragm valve 30 are closed, and the atomizers are inactive. If for any reason the relative humidity should rise and cause further elongation of the membranes, the beam 80 would swing further downward with its pointed stud 82 even moving out of contact with the valve 88 which could then rest on the nozzle 100 as shown in Fig. 6.

Suppose the relative humidity begins to fall (as usually happens when the atomizers are inactive), causing the membranes to shorten. The beam 80 will rise and swing the valve 88 upward to some such position as shown in Fig. 7. During this upward swing of the valve 88 the distance between it and the nozzle 100 will become sufficient to provide an effective opening of the vent, which means that the air beyond the restriction valve 126 will escape faster than it is being supplied through this valve. Bellows 106 will contract, switch 110 will close, the solenoid 120 and diaphragm valves 30 will open, air from the supply 22 will flow to the atomizers 30, and moisture will be discharged into the atmosphere.

If the nozzle 100 remained stationary, as it has heretofore in available apparatus, then before the atomizers could be rendered inactive, the valve 88 would then have to travel downward until it came close enough to the vent 100 to effectively close it. This would mean a needless delay in the shutting off of the moisture being discharged into the room, and because of this the relative humidity will rise appreciably above that desired and produce objectionable overruns. Such delays are avoided by the improved apparatus because soon after the atomizers go into action the vent 100 is moved toward the valve 88.

As previously described, when the diaphragm valve 30 is opened for flow of air to the atomizers, the air also flows along pipe 138, past check valve 140 and through the pipe 142 and tube 144 to the restriction valve 148. Since this is always set for a somewhat greater rate of flow than the rate of escape of air through the vent 160 from the tank 158, the bellows 150 will soon expand, swing the lever 96 upward and thus move the vent 100 closer to the valve 88 as shown in Fig. 8.

The vent will remain in this elevated position so long as the distance between it and the valve 88 is greater than required for effective closing of the vent. But as the relative humidity rises the membranes elongate and the valve 88 swings downward. Because the vent 100 is elevated the valve does not have to move downward, to effectively close the vent, as far as the valve would have been obliged to travel had the vent remained in its lowermost position. In other words, the rise of the relative humidity and the duration of the atomizer discharge need not be as great as would be the case if the vent were of the fixed type heretofore used. On the contrary, with the vent elevated as shown in Fig. 8 the rise of relative humidity and the duration of the atomizer discharge are materially reduced.

Very promptly after the relative humidity starts to rise the valve 88 is moved close enough to the elevated vent to effectively close it. This of course causes the bellows 106 to expand and open switch 110 which brings about the deenergization of the solenoid valve which thereupon closes and cuts off the air pressure effective on the diaphragm valve. The closing of the solenoid valve against the air supply, simultaneously opens a vent 120a thereof for escape of the air acting on the diaphragm of the diaphragm valve. The latter closes to shut off the flow of air through pipe 24 and its vent 30a is opened to reduce the pressure of the air in the pipes 24a and 138 to atmosphere. The check valve 140 holds back the air pressure in the system beyond it until the escape of air through the vent 160 of the tank 158 so reduces the pressure in bellows 150 that its resiliency plus the pull of spring 170 swings the lever 96 back to its horizontal position. In the meantime, if the relative humidity has continued to increase and elongate the membranes the pointed stud 82 may move to the position seen in Fig. 9, before the lever 96 is shifted downward. If this occurs the valve 88 will merely come to rest on the nozzle 100 as shown. As the latter moves to its lowermost position when the lever 96 swings downward, the valve 88 will follow downward until it again contacts the pointed stud 82.

The shifting of the vent 100 toward and from the valve 88 makes the control apparatus exceedingly sensitive and produces more operations of the apparatus in the same period of time than could occur if a fixed vent were employed. This results in the relative humidity being controlled between very narrow limits and such overruns as do occur outside these limits are not excessive. In short, the variations of the relative humidity from that desired are so small in extent and duration that for all practical purposes the relative humidity can properly be said to remain substantially constant.

I claim:

1. An apparatus including humidity responsive means, means for varying the humidity, and control means actuated by said humidity responsive means to effect operation of said humidity varying means so as to maintain a preselected humidity condition, said control means including first means having a pair of cooperative elements operable when in a first relationship to effect operation of said humidity varying means and when in a second relationship inoperative to effect operation of said humidity varying means, second means operable responsive to said first means when in said first relationship to vary the relationship of said pair of elements of the first means from said first relationship, and limiting means associated with one of said pair of elements for limiting its movement from its position in said first relationship to an amount substantially equal to the difference between said first and second relationships, whereby said one element in moving from its position in said first relationship toward its position in said second relationship engages the limiting means before achieving said second relationship and remains engaged with said limiting means until subsequent movement of said other element produces said second relationship.

2. An apparatus including atmospheric condition responsive means, means for varying the atmospheric condition, and control means actuated by said condition responsive means to control operation of said atmospheric condition varying means so as to maintain a preselected atmospheric condition, said control means comprising first means constituting a fluid pressure system having a pair of cooperative elements operative when in a first predetermined relationship to vary the pressure in said system to effect operation of said atmospheric condition varying means and when in a second predetermined relationship to again vary the pressure in said system so as to render said atmospheric condition varying means inoperative, second means operable responsive to said first means when in said first relationship to vary the relationship of said pair of elements of the first means from said first relationship, one of said elements being operatively associated with said atmospheric condition responsive means for movement thereby, the other of said elements being operatively associated with said second means for movement thereby when the latter means is operated, and means operatively associated with said other element for limiting its movement to an amount substantially equal to the difference in positioning of said elements in said first and second predetermined relationships, and whereby said other element in moving from its position in said first relationship toward its position in said second relationship engages the limiting means before achieving said second relationship and remains engaged with said limiting means until subsequent movement of said one element produces said second relationship.

3. An apparatus according to claim 1, and wherein said second means includes means controlling time lag responsiveness of said second means to said first means.

4. An apparatus including atmospheric condition responsive means, means for varying the atmospheric condition, and control means actuated by said condition responsive means to control operation of said atmospheric condition varying means so as to maintain a preselected atmospheric condition, said control means comprising first means constituting a fluid pressure system, said first means having a pair of cooperative elements, one of said elements being a movable valve associated with said atmospheric condition responsive means for movement thereby as the condition varies, the other of said elements being a movable vent cooperative with said valve so that with a first preselected relationship between the vent and valve said system is vented and with a second preselected relationship said system is closed whereby the pressure in the system is varied, said system being associated with said atmospheric condition varying means so as to effect operation thereof in order to maintain said preselected atmospheric condition, and said control means also including second means operable by said first means when the latter are in their venting relationship to vary the relative positioning of the vent and valve from the venting relationship, said vent being operatively associated with said second means for movement thereby upon operation of the latter, and means operatively associated with said vent for limiting its movement to an amount substantially equal to the difference in positioning of said vent and valve in the first and second preselected relationships, and whereby said vent in moving from its position in said first relationship toward its position in said second relationship engages the limiting means before achieving said second relationship and remains engaged with said limiting means until subsequent movement of said valve produces said second relationship.

5. An apparatus according to claim 2, and wherein said second means is a fluid pressure means and includes a bellows with which said other element is associated, said bellows being expanded upon movement of said first means to said first relationship, a reservoir and a restricted outlet communicating with said bellows and effecting contraction thereof after said first means returns to said second relationship and upon expiration of a predetermined time lag.

6. An apparatus according to claim 4, and wherein said second means is a fluid pressure means and includes a bellows expanded when said first means assume their venting relationship, said bellows having operative connection with said vent for moving the latter relative to the valve upon expansion and contraction of the bellows, a reservoir and a restricted outlet communicating with said bellows and effecting contraction thereof after said first means returns to its second preselected relationship and upon expiration of a predetermined time lag.

7. An apparatus for controlling the operation of an on-off humidifier affecting the moisture content of the atmospere in order to maintain a preselected moisture content substantially constant, comprising humidity responsive means, means for varying the humidity of the atmosphere, and control means actuated by said humidity responsive means to control operation of said humidity varying means, said control means including first means constituting a fluid pressure system, said first means having a pair of cooperative elements, one of said elements being a movable valve associated with said humidity responsive means for movement thereby as the humidity varies, the other of said elements being a movable vent cooperative with said valve so that with a first preselected relationship between the vent and valve said system is vented and with a second preselected relationship said system is closed whereby the pressure in the system is varied, said system being associated with said humidity varying means so as to control operation thereof in order to maintain said preselected moisture content substantially constant, and said control means also including second means operable by said first means when the latter are in their venting relationship to vary the relative positioning of the vent and valve from the venting relationship, said vent being operatively associated with said second means for movement thereby upon operation of the latter, and means operatively associated with said vent for limiting its movement to an amount substantially equal to the difference in positioning of said vent and valve in the first and second preselected relationships, and whereby said vent in moving from its position in said first relationship toward its position in said second relationship engages the limiting means before achieving said second relationship and remains engaged with said limiting means until subsequent movement of said valve produces said second relationship.

8. An apparatus according to claim 7, and whereby said second means is a fluid pressure means independent of said fluid pressure system and includes a bellows expanded when said first means assume their venting relationship, said bellows having operative connection with said vent for moving the latter relative to the valve upon expansion and contraction of the bellows, a reservoir and a restricted outlet communicating with said bellows and effecting contraction thereof after said first means returns to its second preselected relationship and upon expiration of a predetermined time lag.

9. An apparatus including humidity responsive means, means for varying the humidity, and control means actuated by said humidity responsive means to effect operation of said humidity varying means so as to maintain a preselected humidity, said control means including first means having a pair of cooperative elements operable when in a first relationship to effect operation of said humidity varying means and when in a second relationship inoperative to effect operation of said humidity varying means, second means operable responsive to said first means when in said first relationship to vary the relationship of said pair of elements of the first means from said first relationship, and limiting means associated with one of said pair of elements for limiting its movement toward and away from the other element to an amount such that operation of said humidity varying means is effected when the other element is at a position indicative of the desired humidity and when the one element is at its position in the said first relationship and such that the humidity varying means is stopped when the other element is at said position indicative of the desired humidity and when the one element is at its position in said second relationship, said amount of movement of said one element being substantially equal to the difference in positioning of said elements between said first and second relationships, and whereby said one element in moving from its position in said first relationship toward its position in said second relationship engages the limiting means before achieving said second relationship and remains engaged with said limiting means until subsequent movement of said other element produces said second relationship.

10. An apparatus including atmospheric condition responsive means, means for varying the atmospheric condition, and control means actuated by said condition responsive means to control operation of said atmospheric condition varying means so as to maintain a preselected atmospheric condition, said control means comprising first means constituting a fluid pressure system, said first means having a pair of cooperative elements, one of said elements being a movable valve associated with said atmospheric condition responsive means for movement thereby as the condition varies, the other of said elements being a movable vent cooperative with said valve so that with a first preselected relationship between the vent and valve said system is vented and with a second preselected relationship said system is closed whereby the pressure in the system is varied, said system being associated with said atmospheric condition varying means so as to effect operation thereof in order to maintain said preselected atmospheric condition, and said control means also including second means operable by said first means when the latter are in their venting relationship to vary the relative positioning of the vent and valve from the venting relationship, said vent being operatively associated with said second means for movement thereby upon operation of the latter, and limiting means associated with said vent for limiting its movement toward and away from the valve by an amount such that operation of said atmospheric condition varying means is effected when the valve is at a position indicative of the desired atmospheric condition and when the vent is at its position in the first relationship and such that the atmospheric condition varying means is stopped when valve is at said position indicative of the desired atmospheric condition and when the vent is at its position in said second relationship, and whereby said vent in moving from its position in said first relationship toward its position in said second relationship engages the limiting means before achieving said second relationship and remains engaged with said limiting means until subsequent movement of said valve produces said second relationship.

11. Control apparatus for controlling the operation of an on-off humidifier affecting the moisture content of the atmosphere of an enclosure in order to maintain the moisture content substantially constant, comprising a pressure system periodically operated to cause moisture to be discharged within the enclosure, animal membranes sensitive to the moisture content of the atmosphere, the membranes being fixed at one end and movable at the other end, the movable end being connected to a beam pivotally mounted at one end and actuated by the membranes in their movements in sensing the moisture content, a valve pivoted at one end the other end being engaged by the beam to move the valve, a fluid pressure system comprising an expansible bellows, an adjustable restricted outlet and a movable vent, the movable vent being juxtaposed with respect to the valve, the valve regulating the amount of fluid within the fluid pressure system by its movement with respect to the vent, the valve moving away from the vent changing the amount of fluid to a predetermined pressure in the fluid pressure system and contracting the bellows, an electric switch in circuit with a solenoid operated valve, the switch being actuated by the contracting of the bellows to energize the solenoid and open the valve, the valve being in the pressure system, the opening of the valve allowing pressure to enter the humidifier to discharge moisture into the enclosure, an independent second fluid pressure system, means connecting the second fluid pressure system to the pressure system, the opening of the solenoid valve changing the amount of fluid in the second fluid pressure system, means operated by and included in the second fluid pressure system for moving the vent toward the valve upon a change in the amount of fluid in the second fluid pressure system to restrict the movement of the valve toward the vent to a minimum in attaining a different predetermined pressure, the valve moving toward the vent by the actuation of the beam by the movement of the membranes causing a building up of the different predetermined pressure in the fluid pressure system and expanding the bellows, the bellows upon expanding actuating the switch and deenergizing the solenoid to close the valve in the pressure system and stop the action of the humidifier, the closing of the solenoid valve changing the amount of fluid in the second fluid pressure system, and means for moving the vent away from the valve when the amount of fluid in the second fluid pressure system is changed, to restrict the movement of the valve away from the vent to a minimum in attaining the predetermined pressure and thus operating the switch to again open the solenoid valve, whereby the restricted movements of valve and the movement of the vent results in maintaining the moisture content of the atmosphere in the enclosure substantially constant.

12. Control apparatus for controlling the operation of an on-off humidifier affecting the moisture content of the atmosphere of an enclosure in order to maintain the moisture content substantially constant, comprising a pressure system periodically operated to cause moisture to be discharged within the enclosure, animal membranes sensitive to the moisture content of the atmosphere, the membranes being fixed at one end and movable at the other end, the movable end being connected to a beam pivotally mounted at one end and actuated by the membranes in their movements in sensing the moisture content, a valve pivoted at one end, the other end being engaged by the beam to move the valve, a fluid pressure system, a movable vent in the fluid pressure system and juxtaposed with respect to said valve, which valve regulates the amount of fluid in the fluid pressure system, movement of the valve relative to the vent producing pressure changes in the fluid pressure system, means actuated by attainment of a predetermined pressure condition in the fluid pressure system opening the pressure system to discharge the moisture to the enclosure, an independent second fluid pressure system, means connecting the second fluid pressure system to the pressure system, the second fluid pressure system comprising an expansible bellows, an adjustable restricted outlet and a reservoir, the amount of fluid in the second fluid pressure system being changed by the opening of the pressure system, the bellows being expanded by the change of the amount of fluid in the second fluid pressure system, a lever pivoted at one end thereof to the control apparatus, the lever carrying the vent adjacent the pivot, the bellows being adjacent the other end of the lever and actuating the lever when expanded to move the vent toward the valve to restrict the movement of the valve toward the vent when actuated by the membranes, the movement of the valve toward the moved vent changing the amount of pressure in the fluid pressure system to a different predetermined pressure to actuate the actuating means upon attainment of the different predetermined pressure to close the pressure system and stop the discharge of the moisture to the enclosure, the stopping of the pressure system changing the amount of pressure in the second fluid pressure system and contracting the bellows, and a coil spring adjacent the bellows, one end being fixed to the control apparatus and the other end being attached to the lever between the bellows and the vent, the spring moving the lever downward against the bellows and moving the vent away from the valve thereby restricting the movement of the valve away from the vent to a minimum in attaining the predetermined pressure and thus starting the humidifier, whereby the restricted movements of the valve and the movement of the vent results in maintaining the moisture content of the atmosphere of the enclosure substantially constant.

13. Control apparatus for controlling the operation of an on-off humidifier affecting the moisture content of the atmosphere of an enclosure in order to maintain the moisture content substantially constant, comprising a pressure system periodically operated to cause moisture to be discharged within the enclosure, animal membranes sensitive to the moisture content of the atmosphere, the membranes being fixed at one end and movable at the other end, the movable end being connected to a beam pivotally mounted at one end and actuated by the membranes in their movements in sensing the moisture content, a valve pivoted at one end, the other end being engaged by the beam to move the valve, a fluid pressure system comprising an expansible bellows, an adjustable restricted outlet and a movable vent, the movable vent being juxtaposed with respect to the valve, the valve regulating the amount of fluid within the fluid pressure system by its movement with respect to the vent, the valve moving away from the vent changing the amount of fluid to a predetermined pressure in the fluid pressure system and contracting the bellows, an electric switch in circuit with a solenoid operated valve, the switch being actuated by the contracting of the bellows to energize the solenoid and open the valve, the valve being in the pressure system, the opening of the valve allowing pressure to enter the humidifier to discharge moisture into the enclosure, an independent second fluid pressure system, means connecting the second fluid pressure system to the pressure system, the second fluid pressure system comprising an expansible bellows, an adjustable restricted outlet and a reservoir, the amount of fluid in the second fluid pressure system being changed by the opening of the pressure system, the bellows being expanded by the change of the amount of fluid in the second fluid pressure system, a lever pivoted at one end thereof to the control apparatus, the lever carrying the vent adjacent the pivot, the bellows of the second fluid pressure system being adjacent the other end of the lever, and actuating the lever when expanded to move the vent toward the valve to restrict the movement of the valve toward the vent when actuated by the membranes, the movement of the valve toward the moved vent changing the amount of pressure in the fluid pressure system to a different predetermined pressure to actuate the switch and deenergize the solenoid to close the valve in the pressure system and stop the action of the humidifier, the closing of the valve in the pressure system changing the amount of pressure in the second fluid pressure system, thus contracting the bellows, and a coil spring adjacent the bellows, one end being fixed to the control apparatus and the other end being attached to the lever between the bellows and the vent, the spring moving the lever downward against the bellows and moving the vent away from the valve thereby restricting the movement of the valve away from the vent to a minimum in attaining the predetermined pressure to start the humidifier, whereby the restricted movements of the valve and the movement of the vent results in maintaining the moisture content of the atmosphere of the enclosure substantially constant.

References Cited in the file of this patent

UNITED STATES PATENTS

| Number | Name | Date |
|---|---|---|
| 1,312,253 | Johnson | Aug. 5, 1919 |
| 1,680,750 | Smoot | Aug. 14, 1928 |
| 1,897,857 | Otto | Feb. 14, 1933 |
| 2,053,492 | Otto | Sept. 8, 1936 |
| 2,062,437 | Abbott | Dec. 1, 1936 |
| 2,117,800 | Harrison | May 17, 1938 |
| 2,312,671 | Otto | Mar. 2, 1943 |
| 2,387,668 | Loepsinger | Oct. 23, 1945 |
| 2,437,156 | Frick | Mar. 7, 1948 |
| 2,651,468 | Joesting | Sept. 8, 1953 |

OTHER REFERENCES

Principles of Industrial Process Control, by D. P. Eckman, published 1945 by John Wiley and Sons, pages 65 and 66.